(12) United States Patent
Kodaissi et al.

(10) Patent No.: US 6,364,022 B1
(45) Date of Patent: Apr. 2, 2002

(54) HYBRID RISER FOR DEEP WATER

(75) Inventors: Elie Kodaissi, Rouen; Alain Coutarel, Mont-Saint-Aignan, both of (FR)

(73) Assignee: Coflexip (FR)

( * ) Notice: Subject to any disclaimer, the term of this patent is extended or adjusted under 35 U.S.C. 154(b) by 0 days.

(21) Appl. No.: 09/521,099

(22) Filed: Mar. 7, 2000

(30) Foreign Application Priority Data

Mar. 9, 1999 (FR) .............................................. 99 02903
Feb. 21, 2000 (FR) .............................................. 00 02126

(51) Int. Cl.[7] .............................................. E21B 17/01
(52) U.S. Cl. .................................... 166/367; 405/224.3
(58) Field of Search ............................... 166/350, 367; 405/158, 169, 170, 171, 172, 195.1, 224.2, 224.3

(56) References Cited

U.S. PATENT DOCUMENTS

| | | | |
|---|---|---|---|
| 4,023,517 A | * 5/1977 | Ryan | |
| 4,519,726 A | * 5/1985 | Knowles et al. | 405/195.1 |
| 5,288,253 A | * 2/1994 | Urdshals et al. | |
| 5,615,977 A | * 4/1997 | Moses et al. | 405/195.1 |
| 5,639,187 A | * 6/1997 | Mungall et al. | 405/195.1 |
| 5,722,492 A | * 3/1998 | Finn | 166/367 |
| 5,971,075 A | * 10/1999 | Odru et al. | 166/350 |

FOREIGN PATENT DOCUMENTS

| | | |
|---|---|---|
| FR | 2205880 | 5/1974 |
| WO | 9905388 | 7/1998 |

OTHER PUBLICATIONS

American Petroleum Institute—"Recommended Practice for Flexible Pipe" API Recommended Practice 17B (RP 17B) First Edition, Jun. 1, 1988.

American Petroleum Institute—"Specification for Unbonded Flexible Pipe" API Specification 17J First Edition, Dec. 1996.

* cited by examiner

*Primary Examiner*—David Bagnell
*Assistant Examiner*—Jennifer Dougherty
(74) *Attorney, Agent, or Firm*—Ostrolenk, Faber, Gerb & Soffen, LLP

(57) ABSTRACT

Hybrid pipe for deep water, comprising a metallic rigid central part having an upper end of which is connected to an upper portion of flexible pipe of predetermined length and having a lower end of which is connected to a lower portion of flexible pipe of a length at least equal of the length of the upper portion of flexible pipe. The lower portion may have a wave-shaped form to absorb motion. The wave is formed by buoyant members on the lower flexible portion by an arch tethered to the sea bed on which the wave-shaped portion rests.

19 Claims, 5 Drawing Sheets

FIG_1

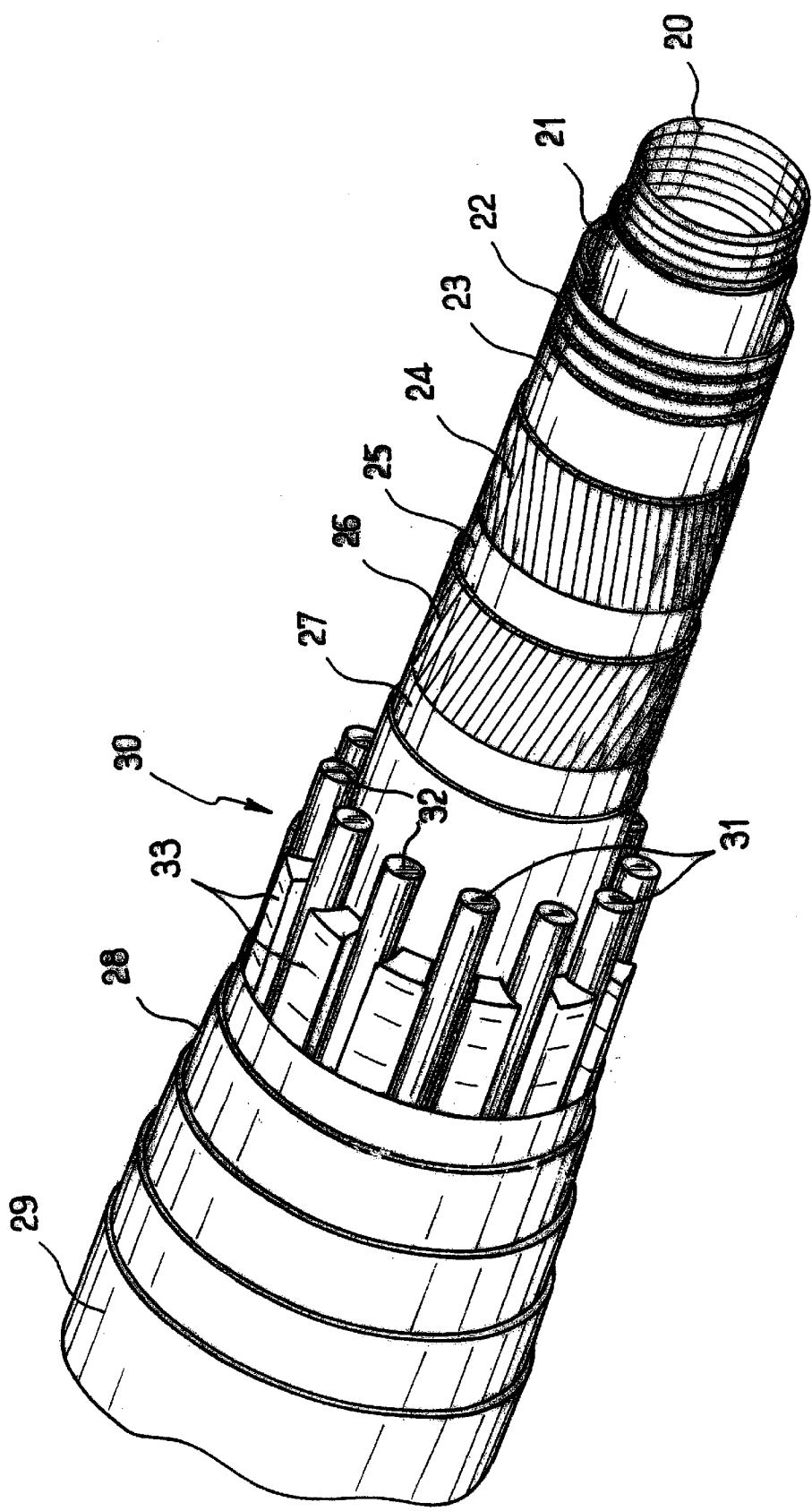
FIG_3

HYBRID RISER FOR DEEP WATER

BACKGROUND OF THE INVENTION

The present invention relates to a hybrid riser for deep water.

Several configurations for transporting the fluid from the field between a well head and/or manifold and surface support have been proposed.

The configurations used depend, in general, on the exploitation site, the parameters relating, in particular, to the depth of water and the horizontal and vertical movements of the surface support being taken into consideration in order to select the appropriate configuration and/or the type of riser.

A first known configuration is the configuration known as the free-hanging configuration. In this configuration, the riser has, on the one hand, an upper part which may be considered as being vertical because it makes an angle of between 5 and 30° with respect to a vertical, and, on the other hand, a lower part, one portion of which is curved and one portion of which is horizontal resting on the sea bed. The transition between the curved and horizontal portions occurs at the region where the pipe touches down on the sea bed. In this configuration, and regardless of the type of riser used, the compensation for the vertical movement which causes a heave effect occurs in the lower part of the riser, that is to say in the touch-down region. This heave leads to significant fatigue in the curved portion of the riser.

When a riser, in this free-hanging configuration, consists of a rigid tube or of two concentric rigid tubes, it is known as a steel catenary riser or SCR; the radius of curvature of the curved portion which must not exceed the yield strength of the metallic material of which the SCR is made is relatively large, of the order of 100 meters and even more. Such a large radius of curvature has the effect of moving the point of touch-down away from the vertical line passing through the point of connection to the surface support, and this restricts its use in production zones comprising several wells because one SCR would, in theory be needed for each well. Furthermore, an SCR tolerates very little vertical variation to compensate for the vertical movement of the surface support. In general, the vertical variation has to be less than 1 to 2% of the water's depth. Likewise, the horizontal displacements are limited because they introduce additional fatigue into the curved portion. Finally, the SCR requires the use of a rotary joint at the top where it connects to the surface support.

In spite of its advantages in relation to good thermal insulation and an acceptable cost per unit length, it is nonetheless true that it is little used when the same item of surface support is to serve several well heads and/or when the displacements of the surface support are great compared with the depth of water.

A flexible pipe may be used in deep seas in the free-hanging configuration. It has advantages over the SCR, for example, a far smaller radius of curvature at the curved portion meeting the sea bed, the said radius of curvature having to be greater than the MBR (Minimum Bend Radius) and is typically of the order of 2 to 15 m, namely at least ten times smaller than in the case of the SCR. Furthermore, it allows greater vertical and horizontal movements of the surface support thanks to its better fatigue behaviour. However, it has the drawbacks of being very heavy, not having such good thermal insulation as the SCR, and having a higher cost per unit length than the SCR.

Thus, the free-hanging configuration may be used in seas which are not too deep with surface support that is mobile or tethered to the sea bed and, in general, in sites in which there are few waves and marine currents. For deep seas, the risers are very heavy and, in order to avoid very large suspended weights, it is preferable to use other configurations.

One other configuration consists in appropriately mounting buoyancy means with positive buoyancy so as to distribute the suspended weight between the upper and lower parts of the riser. The riser may consist either of a tower or of an SCR combined with another element which may be laid in various configurations known as LAZY or STEEP S or WAVE, these configurations being represented in the documents API 17B and 17J (AMERICAN PETROLEUM INSTITUTE).

A tower is mounted vertically from the sea bed to which it is fixed by appropriate means up to a certain distance from the surface support. Because of the very substantial weight of the tower, which internally contains a certain number of risers, enormous buoyancy means are intended to be installed at the top to take up most of the weight of the tower. Furthermore, flexible lines with their concave side facing upwards connect the tower to the surface support. These lines, which may consist of short lengths of flexible pipe known as jumpers, are intended, among other things, to allow relative movement between the surface support and the tower. The bundle of flow lines incorporated into the tower may comprise one or more gas lift lines. Furthermore, heave compensation may be achieved by rams mounted between the surface support and the top of the tower.

Another hybrid configuration uses a riser in which the lower part consists of an SCR and the upper part consists of a short flexible pipe (jumper) arranged on buoyancy means such as a buoy known as a buoyancy arch. Thus, the weight of the riser is taken up by the buoyancy means and heave is compensated for by the short length of flexible pipe. However, laying risers in all configurations using mid-water buoyancy means is a relatively lengthy and difficult task. This is because the mid-water buoyancy means are fitted before the riser is laid. These buoyancy means are connected by tethers to deadweights or anchors set in the sea bed. The SCR is then laid, connecting it to the buoyancy means. The short flexible pipe (or jumper) is connected to the floating structure.

Another drawback is associated with the total length of riser which is longer than it would be in a free-hanging configuration.

As to the LAZY or STEEP S or WAVE configurations employing a completely flexible pipe, it is essential that buoyancy means with positive buoyancy be associated with part of the flexible pipe. In the case of an arch, the deadweight has to be lowered onto and secured to the sea bed at a very precise determined point. Then the arch has to be fixed to the deadweight by tethers or chains before the laying of the riser can be resumed. In the case of buoyancy means consisting of buoys arranged in a string along part of the pipe, it is necessary to interrupt the laying of the flexible pipe in order to attach each buoy to the part of the pipe. That operation being is performed on the deck of the laying vessel.

Thus, whatever the envisaged configuration and type of riser used, additional means are needed to take up part of the weight of the riser and/or special means are required to reduce the effect of the heave in the region of touchdown on the sea bed, while keeping in mind the fact that the higher the weight of the rigid part of the riser, when integrated, the larger the buoyancy means will be, which gives rise to a greater drag force (or drag diameter) and greater hydrodynamic loadings.

SUMMARY OF THE INVENTION

The object of the present invention is to propose a new hybrid configuration which makes it possible to eliminate the use of auxiliary techniques such as buoyancy means, the tensioning cables, the flexible or rotating joints and anchorage to the sea bed.

The present invention concerns a hybrid riser, which it comprises a metallic rigid central part, having an upper end which is connected to at least one upper portion of flexible pipe of predetermined length and another lower end which is connected to a portion of flexible pipe of a length at least equal to the length of the upper portion of flexible pipe.

According to another feature of the present invention, the rigid central part is connected to the upper portion of flexible pipe and to the lower flexible pipe by respective fixed coupling devices.

One advantage of the present invention is that the riser obtained is rigid for the most part and has the properties of flexible pipes where it leads off from the surface support and where it touches down on the sea bed.

In addition, the dynamic stresses to which the hybrid riser may be subjected are easily absorbed or compensated for both in the upper part and in the lower part of the riser, by virtue of the presence of true flexible pipes, which allows large excursions of the surface support from which the riser is suspended and allows these without overbending.

Finally, because it is no longer necessary to use buoyancy means, the riser according to the invention can be installed in the manner of a free-hanging configuration. Thus, the riser is as short as possible and has a mean cost per unit length which is roughly equivalent to that of an SCR while at the same time employing flexible portions.

Furthermore, the upper flexible portion takes up all of the weight of the central rigid part and of the lower flexible portion, whereas the latter takes up practically all the dynamic stresses generated by the movements of the surface support. Thus, the surface support can move horizontally and vertically over relatively large distances without significant effects on the riser according to the present invention because the riser is capable of accompanying the movements of the surface support and of doing so without generating additional fatigue and/or additional wear in the curved part of the lower portion which, by virtue of its flexibility, is able to move along the sea bed and appropriately absorb the heave effect.

According to the present invention, the lower portion of flexible pipe includes at least one section which is in the shape of a wave and which is formed between the end for a connection to the rigid central portion and the touch down point with the sea bed.

One advantage of the invention lies in reducing the angle at the top of the riser to bring it down about 3°, which enables the amplitude of the movements of the said riser under severe conditions of use to be increased.

BRIEF DESCRIPTION OF THE DRAWINGS

Other advantages and features will emerge from reading the description of one preferred embodiment of the invention and from the appended drawings in which:

FIG. 3 is a perspective part view of a flexible pipe which is connected to the rigid central part of the riser.

DESCRIPTION OF A PREFERRED EMBODIMENT

Figure 1:
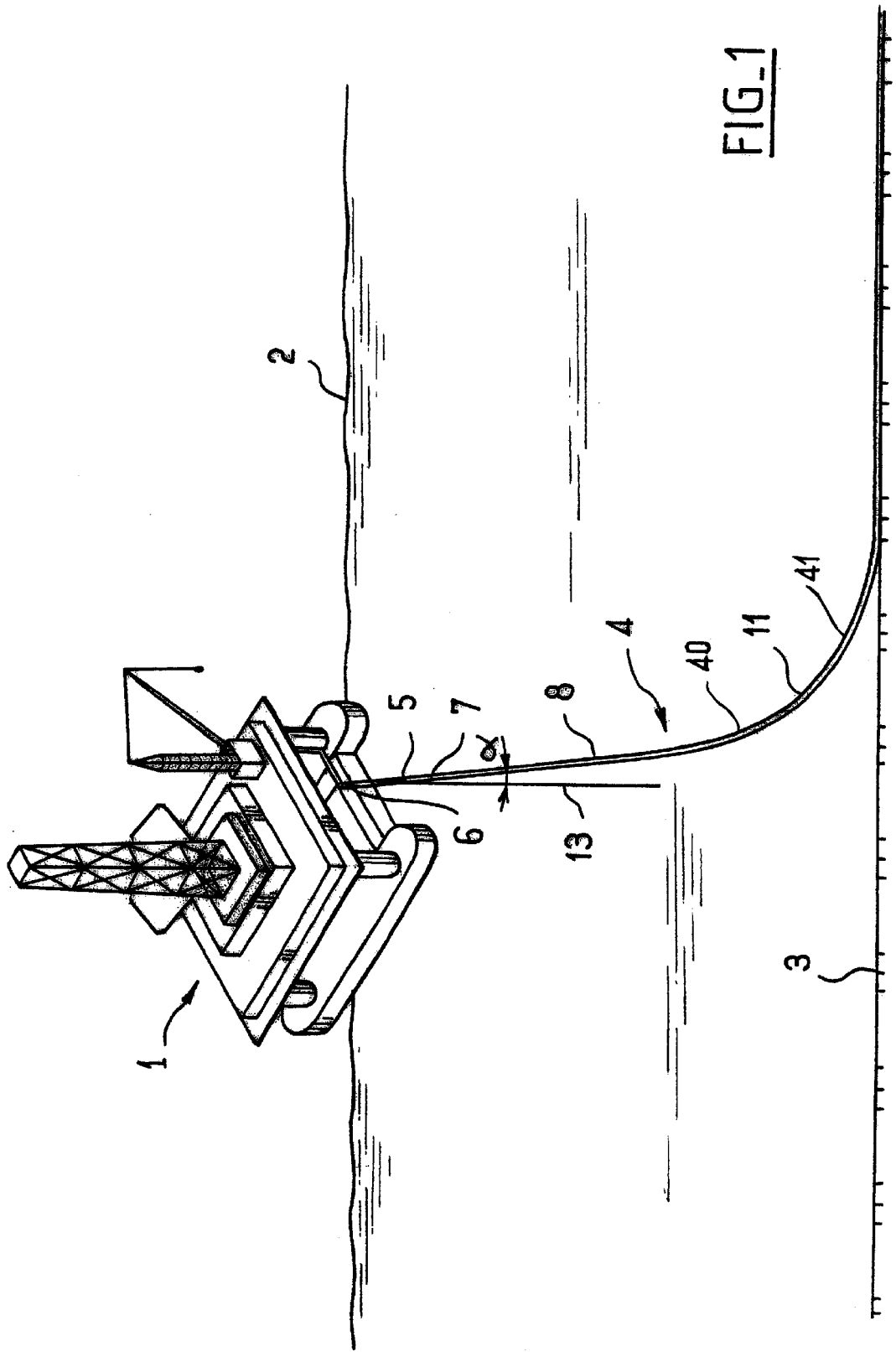
FIG. 1 is a diagrammatic depiction of a platform at the water's surface and to which a riser according to the present invention is connected.
Figure 2:
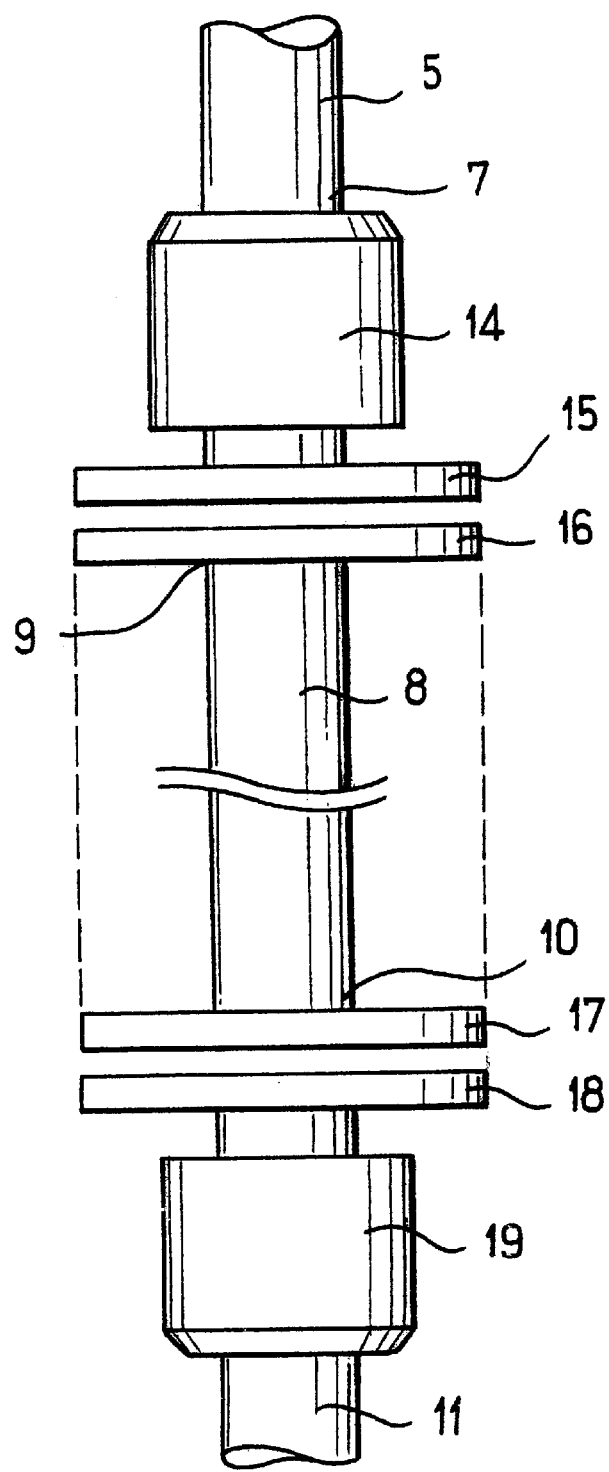
FIG. 2 is a part view of the riser, restricted to the connections between the flexible parts and the rigid part.

The double hybrid riser according to the invention, is called that because it comprises two flexible parts, each located at one end of a rigid central part. The riser is arranged between a surface support such as a platform 1 lying at the surface 2 of the sea, and the sea bed 3. It is also possible for the surface support to consist of a vessel.

The riser 4 comprises an upper part consisting of a portion 5 of flexible pipe. The length of the upper part pipe is predetermined dependent on the horizontal movements of the platform 1, the effects of the heave or marine currents present in the sea, which effects may act on the upper flexible portion 5. Typically, the predetermined length of the flexible pipe portion 5 is long enough for the connection with the rigid portion 8 described hereinbelow to lie in a region below the surface which is practically not affected by the heave. For example, the length of the upper portion of flexible pipe is between 50 and 150 m.

The upper flexible portion 5 is of a structure known per se such as the structure depicted in FIG. 3, but is arranged to act like a riser and which will be described later on. The upper end 6 of the flexible portion 5 is connected to the platform 1 in the same way as a conventional flexible pipe is connected. A stiffener may be mounted on the flexible portion 5, either in the region of the connection with the platform 1, or in the region of the connection with the rigid part 8.

The lower end 7 of the flexible portion 5 is connected to a metal central rigid part 8, the structure of which is identical or similar to that of a conventional rigid riser. The connection is achieved by an end fitting 14 mounted at the lower end 7 of the flexible portion 5, and the flange 15 of the fitting 14 is bolted to a flange 16 mounted on the upper end 9 of the rigid central part 8.

A flexible pipe 11 is connected as described above, to the lower end 10 of the rigid central part 8 using flanges 17 and 18 and an end fitting 19.

The length of the flexible pipe 11 is at least equal to that of the flexible portion 5 and, in general, is the length much greater because part of the flexible pipe 11 constitutes a flow line connected to sea bed equipment, not depicted, which may consist of a manifold or well head or may be extended by means of a rigid or flexible flow line. As a preference, the length of the flexible pipe 11 is greater than 200 meters or even greater than 300 meters so that the point 12 of touchdown on the sea bed lies approximately in the region at which a free-hanging flexible pipe suspended between the platform 1 and the sea bed 3 would touch down. It goes without saying that the part of the lower flexible pipe 11 which rests on the sea bed may be as much as several hundred meters long.

The double hybrid riser depicted in FIG. 1 makes an angle α with a vertical line 13 passing through the point at which the upper end 6 of the flexible portion 5 is attached to the platform 1. This angle is slightly greater than the angle that a free-hanging flexible pipe would make but is very much smaller than a steel catenary riser configuration would make. In one embodiment, the angle α is between 5 and 25° and is preferably approximately equal to 10°.

The upper flexible portion 5 has a structure which is suitable for withstanding almost all of the tensile forces, as it is given a tensile armour layer or layers of appropriate armouring and a pressure vault/carcass which is relatively small because in the first few hundred meters of sea depth, the said assembly does not have to have too great a crushing strength because of the relatively low external pressure exerted on the upper flexible portion 5.

By contrast, the heave produced by the vertical movements (or vertical components) of the surface support, such as a ship or a platform, are passed on almost in their entirety to the area or point of touchdown on the seabed 3. The presence of a flexible portion in the riser in this zone makes it possible to conceive of a structure for the flexible portion which is such that it has to withstand the external pressure which is all the higher, the deeper the depth at which the field is situated. For this purpose, the lower flexible portion 11 will have relatively small tensile armour or tensile armour layers, the tensile forces being borne by the upper flexible portion 5, but has a pressure vault/carcass assembly capable of withstanding crushing and the hoop-stress components developed in the flexible pipe. By virtue of the combination of the two flexible portions one on each side of the intermediate rigid part, the fatigue of the riser is greatly reduced, while at the same time allowing relatively large lateral or horizontal movements of the surface support.

The riser according to the invention may have passive thermal insulation as is customarily provided, that is the riser assembly has an exterior layer made of an insulating material or, in the case of a pipe-in-pipe rigid part, may have a layer of insulation between the pipes of the rigid part and a layer of insulation placed under the outer sealing sheath in the case of the flexible parts. In this case, the gas lift means are independent of the riser.

In cases where significant thermal insulation is needed, it is preferable for the flexible portions of the riser to be produced as depicted in FIG. 3, even though the flexible lower portion of the riser may have a different structure, for example may be devoid of the heating and/or gas-lift lines.

FIG. 3 partially depicts a structure of an upper flexible portion 5 comprising, from the inside outwards:
- a metallic carcass 20,
- an internal sealing sheath 21,
- a pressure vault 22,
- possibly an intermediate sheath 23,
- a first layer of tensile armour 24 wound at a predetermined angle,
- possibly another intermediate sheath 25,
- another layer of tensile armour 26,
- possibly a third intermediate sheath 27, the assembly 20 to 27 constituting what is commonly known as the core of the flexible pipe depicted in FIG. 3,
- thermal insulation 28 arranged between an external sealing sheath 29 and a subassembly 30 comprising the lines 31 and 32 and spacer pieces 33.

The lines 31, distributed uniformly around the periphery of the core, are used for circulating a heating fluid, such as water, so as to maintain the temperature of the fluid from the field and prevent this fluid from cooling abruptly between the sea bed 3 and the platform 1. These heating lines 31 are appropriately connected to similar pipes arranged in the rigid part 8.

The lines 32, also distributed uniformly at the periphery of the core, for example alternating with the heating lines 31, are used for sending gas into the field in order to drive out the fluid from the field and, should the need arise, give it sufficient pressure.

The spacer pieces 33 may be provided between the consecutive lines in order to hold them in place and prevent them from moving.

In one embodiment, the lower flexible pipe portion 11 has at least one curved section 40, for example curved in the shape of a wave 41, so as to give the flexible pipe portion 11 positive buoyancy. Various means may be used to obtain a curved section in the shape of a wave, such as those depicted in FIGS. 4 to 6.

Figure 5:
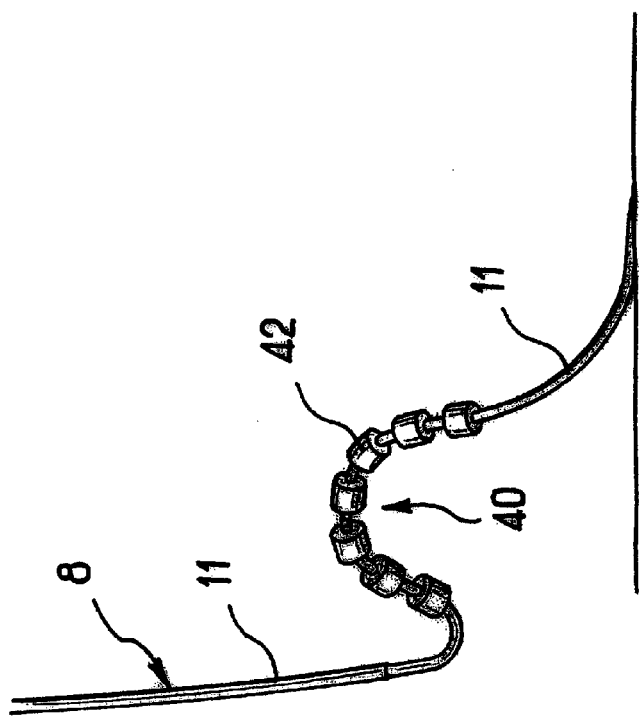
FIG. 5 is another partial and diagrammatic depiction of the wave-shaped section of the lower portion of the riser of FIG. 1.
Figure 4:
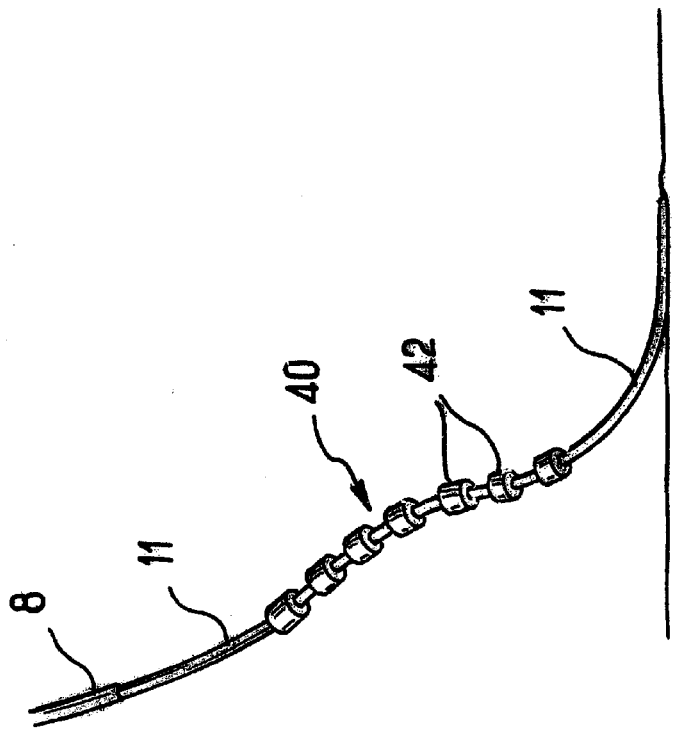
FIG. 4 is a partial and diagrammatic depiction of the wave-shaped section of the lower portion of the riser of FIG. 1.

FIG. 4, which is a part view of the flexible pipe portion 11, comprises buoys 42 which are distributed over the section 40. In this example, the wave is in the shape of a bulge when the lower portion 11 is in the normal position. When the platform or the vessel at the water's surface moves closer to the point of contact with the sea bed 3, the section 40 deforms to adopt the shape of a wave, as depicted in FIG. 5, thus preventing the rigid central portion 8 coming into contact with the sea bed.

Although the buoys 42 are distributed uniformly over the entire section 40 of the lower portion 11, it is possible to reduce the number of buoys and to distribute them only at the upper part of the wave, depending on the desired deformation of the section 40, which depends on the amplitude of the movements to which the lower portion 11 is subjected.

Figure 6:
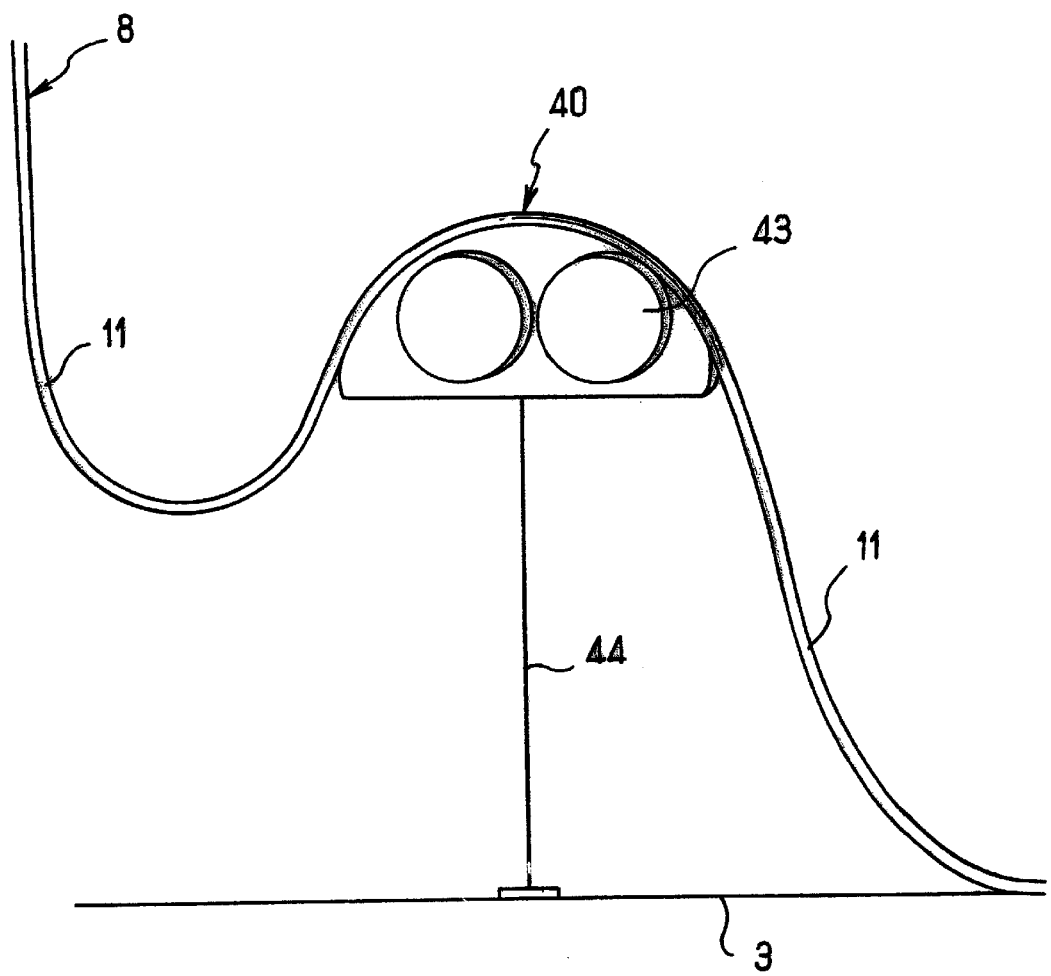
FIG. 6 is a partial and diagrammatic depiction of the means used to obtain the wave-shaped section of the lower portion of the riser of FIG. 1.

Other means which may be used, for example such as those depicted in FIG. 6. In this example, the section 40 rests partially on an arch 43 which is anchored to the sea bed 3 by means of a flexible connecting member 44, so as to allow the arch to move in all directions. The connecting member 44 may consist of a cable or any other equivalent member.

It should be noted that the wave-shaped section allows the angle α to be reduced to bring it down to about 3°. Furthermore, the lower portion of flexible pipe may have various configurations such as LAZY WAVE, with buoyancy buoys arranged in a string to give a distributed buoyancy or LAZY S, by using the arch which gives rise to concentrated buoyancy.

What is claimed is:

1. A hybrid riser extending between a floating support vessel and a subsea structure on the seabed, the riser comprising:
    a rigid central pipe part having a first upper end and an opposite first lower end,
    an upper portion of flexible pipe of predetermined length and having a second lower end connected to the first upper end of the central part and a second upper end connected to the floating support vessel,
    a lower portion of flexible pipe having a third upper end connected to the first lower end of the central part, and the lower portion of flexible pipe including a section which is free hanging to the subsea structure and which is formed between the third upper end for connection to the rigid central part and the third lower end for connection to the subsea structure laid on the sea bed wherein the lower portion includes a wave shaped section.

2. The hybrid riser according to claim 1, further comprising a respective fixed coupling device connecting each of the first ends of the rigid central part to each of the upper and lower portions of flexible pipe.

3. The hybrid riser according to claim 1, wherein that the length of the upper portion of flexible pipe is at least 150 meters.

4. The hybrid riser according to claim 1, wherein the length of the lower portion of flexible pipe is greater than 200 meters.

5. The hybrid riser according to claim 1, wherein the central part has an inside including tubes therein for conveying fluids.

6. The hybrid riser according to claim 1, further comprising the upper portion having a third upper end connected to a surface support; the riser forming with respect to a vertical line passing through the point of connection to the surface support, a lead-off angle which is at least equal to that of a configuration with a single flexible pipe and smaller than that of a steel catenary riser configuration.

7. The hybrid riser according to claim 6, wherein the lead-off angle is between 5 and 25°.

8. The hybrid riser according to claim 1, further comprising buoyancy buoys arranged on the wave-shaped section.

9. The hybrid riser according to claim 8, wherein the buoyancy buoys are distributed over approximately the entire length of the wave-shaped section.

10. The hybrid riser according to claim 8, further comprising the wave-shaped section of the lower portion of flexible pipe having an upper part that extends upwardly, and the buoyancy buoys are on at least the upper part of the wave shaped section.

11. The hybrid riser according to claim 1, further comprising an arch on which the wave-shaped section is rested and formed, the arch being anchored to the sea bed.

12. The hybrid riser according to claim 11, wherein the arch is anchored by a flexible connecting member.

13. The hybrid riser according to claim 1, further comprising a support for the wave-shaped section which is anchored to the sea bed and forms the wave in the wave-shaped section.

14. The hybrid riser according to claim 13, wherein the support is anchored by a flexible connecting member.

15. The hybrid riser according to claim 1, wherein the rigid central part is metallic.

16. The hybrid riser according to claim 1, wherein the lower portion being of a length at least equal to the length of the upper portion of flexible pipe.

17. The hybrid riser of claim 1, wherein the lower portion of flexible pipe is in the shape of at least a catenary.

18. The hybrid riser of claim 1, wherein the wave shaped lower portion of flexible pipe includes an arch shaped section that extends upwardly so that the lower portion has an S-Shape.

19. The hybrid riser according to claim 18, further comprising a support for the wave-shaped section which is anchored to the sea bed and forms the wave in the wave-shaped section.

* * * * *